United States Patent [19]

Franco, Sr.

[11] Patent Number: 5,484,128
[45] Date of Patent: Jan. 16, 1996

[54] BEVERAGE BOTTLE AND GOLF CART MOUNTING APPARATUS

[76] Inventor: James L. Franco, Sr., 8181 Boca Rio Dr., Boca Raton, Fla. 33433

[21] Appl. No.: 251,614

[22] Filed: May 31, 1994

[51] Int. Cl.[6] .................. F16M 13/00; B62J 11/00
[52] U.S. Cl. .................. 248/311.2; 248/218.4; 248/682; 248/230.4
[58] Field of Search .................. 248/311.2, 223.4, 248/225.1, 220.2, 682, 218.4, 230, 541; 224/35, 39, 30 A, 41, 42.03 A, 274; 220/375, 244

[56] References Cited

U.S. PATENT DOCUMENTS

| | | | |
|---|---|---|---|
| 1,070,292 | 8/1913 | Robb | 248/230 |
| 2,406,029 | 8/1946 | Nettesheim | 248/230 |
| 2,496,478 | 2/1950 | Kinnebrew | 248/230 |
| 2,544,817 | 3/1951 | White | 248/218.4 |
| 2,919,096 | 12/1959 | Cohen | 248/223.4 X |
| 3,131,842 | 5/1964 | Dingle, Jr. et al. | 224/29 |
| 3,313,508 | 4/1967 | Mancl | 248/229 |
| 3,318,629 | 5/1967 | Brandt, Jr. | 248/231.4 X |
| 3,844,459 | 10/1974 | Chambers | 224/274 |
| 3,881,677 | 5/1975 | Ihlenfeld | 248/311.2 |
| 4,032,054 | 6/1977 | Duncan | 224/29 B |
| 4,176,770 | 12/1979 | Griggs et al. | 248/682 X |
| 4,345,704 | 8/1982 | Boughton | 224/39 |
| 4,366,922 | 1/1983 | Levine et al. | 248/221.3 X |
| 4,550,930 | 11/1985 | Proffit | 280/655 |
| 4,844,399 | 7/1989 | Harm | 248/311.2 |
| 4,889,267 | 12/1989 | Bolton | 224/274 |
| 4,989,767 | 2/1991 | Buschbom | 224/274 |
| 5,105,958 | 4/1992 | Patton | 215/100 |
| 5,251,777 | 10/1993 | McMahon | 248/311.2 X |
| 5,409,190 | 4/1995 | Mattox | 248/315 |

*Primary Examiner*—Karen J. Chotkowski
*Attorney, Agent, or Firm*—Frank L. Kubler

[57] ABSTRACT

A beverage retaining apparatus for attachment to a part of a structure, the part having a part outer surface and a certain outer surface shape and size, includes a beverage retaining vessel having a vessel wall, a bracket for fitting around the part, the bracket including a part encompassing member having an inner member surface and sized so that the inner member surface is larger than and spaced apart from the part outer surface, and including deformable gripping material for filling the space between the inner member surface and the part outer surface and for deforming to fit the certain shape and size of the part outer surface, and an interconnection structure for connecting the vessel to the bracket. The encompassing member preferably includes a strap member having two strap ends and being longitudinally bent end to end to form a loop configuration for encompassing the part outer surface. The interconnection structure preferably removably connects the vessel to the bracket. The interconnection structure preferably includes a channel recessed into the vessel wall having a channel open end, and a projection extending from the encompassing member and sized for sliding axial insertion into the channel through the channel open end, where the channel laterally surrounds the projection to a sufficient extent for the channel to retain the projection against lateral removal of the projection from the channel.

7 Claims, 2 Drawing Sheets

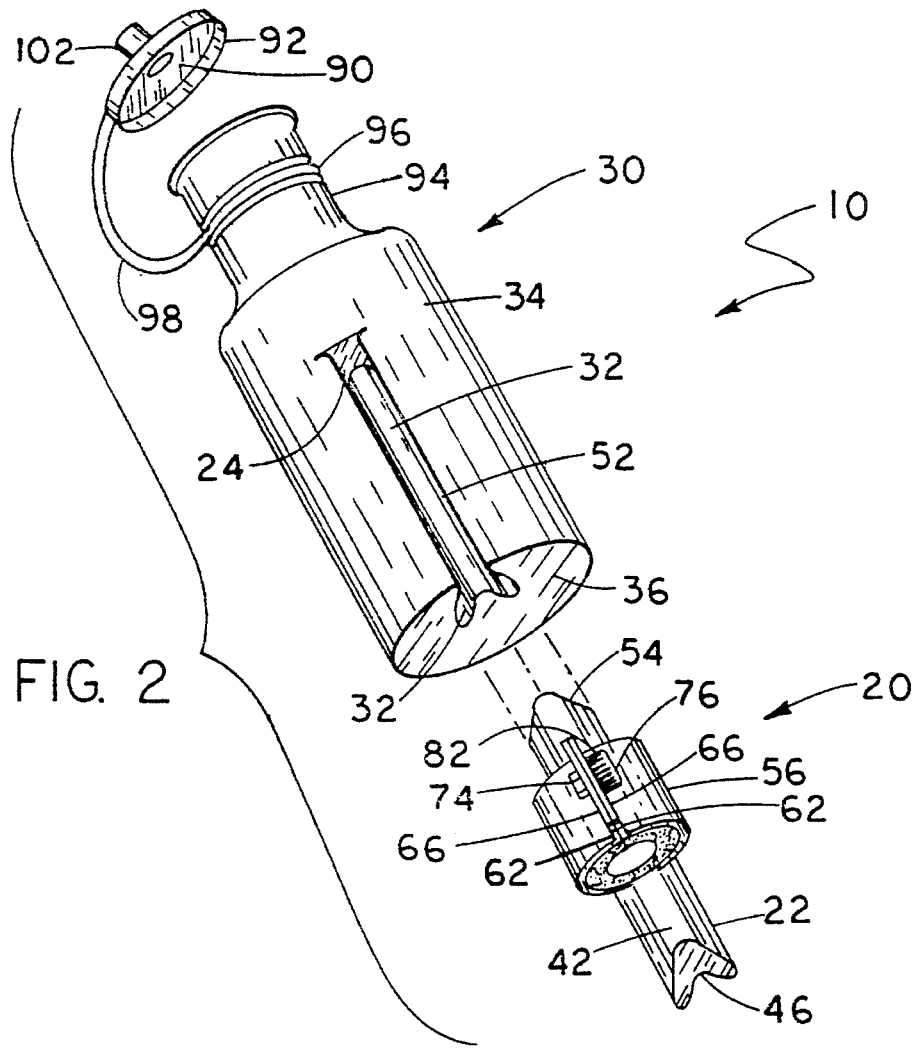
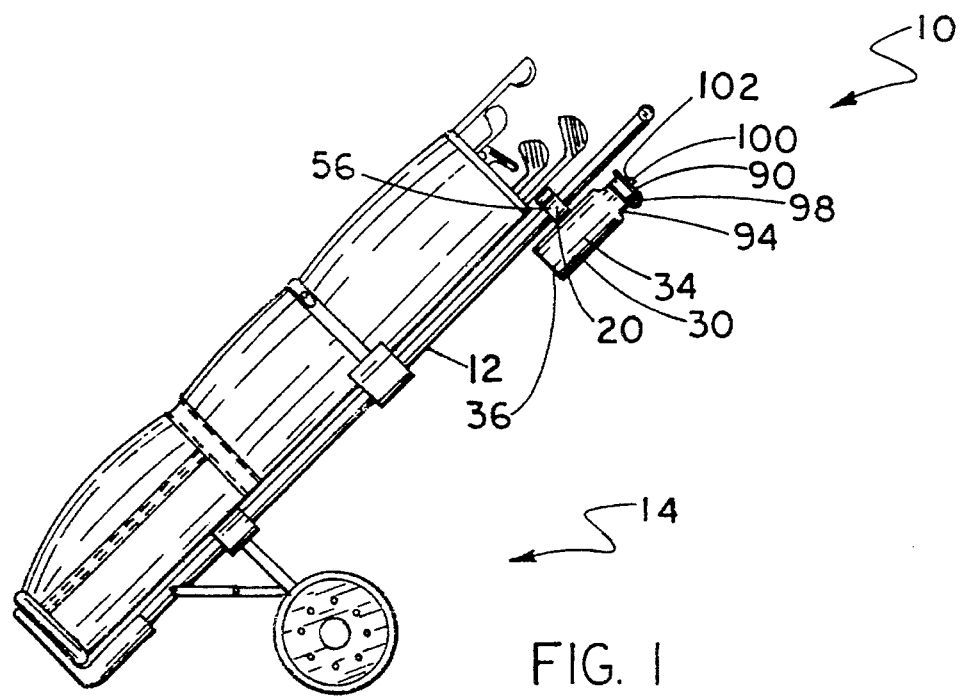

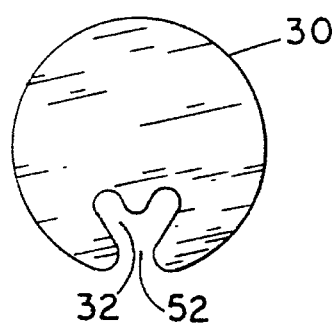
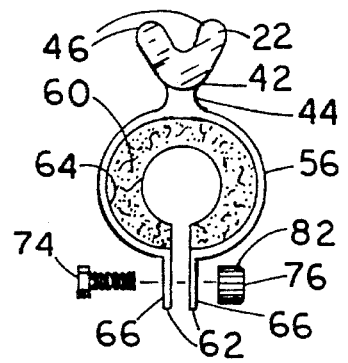
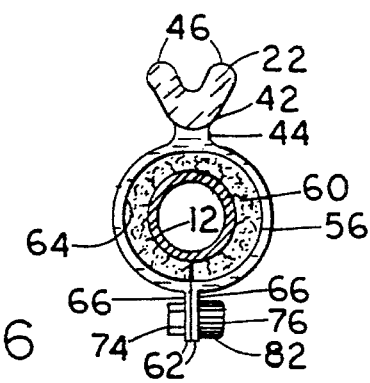
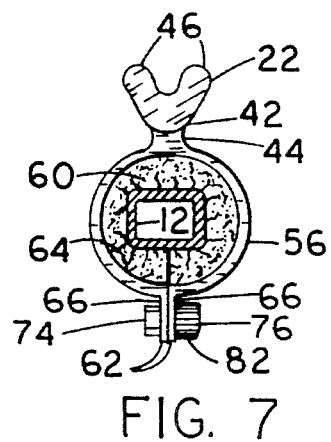
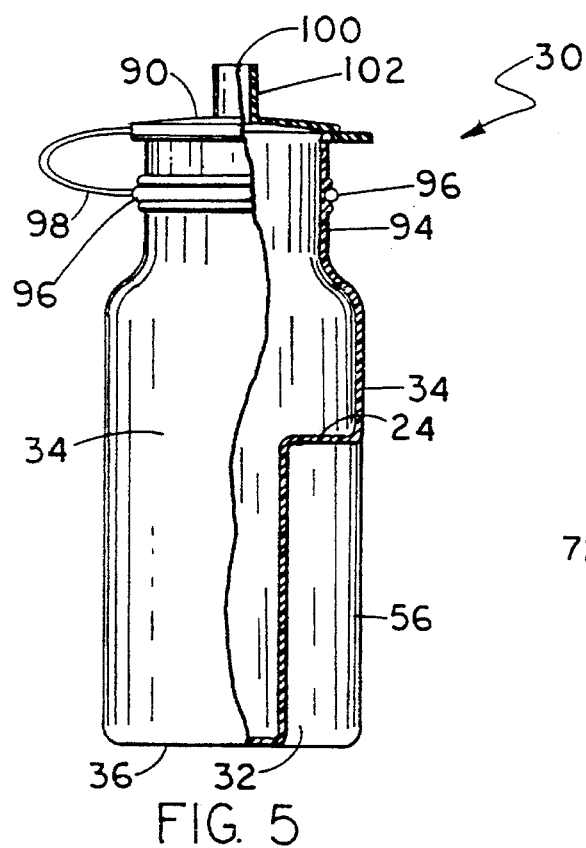
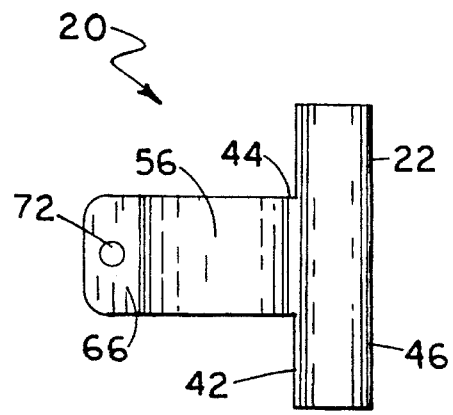

5,484,128

BEVERAGE BOTTLE AND GOLF CART MOUNTING APPARATUS

BACKGROUND OF THE INVENTION

1. Field of the Invention

The present invention relates generally to the field of drinking vessel retaining assemblies for mounting on various structures. More specifically, the present invention relates to an apparatus for mounting on an upper frame member of a golf bag cart. The apparatus includes a frame member engaging clasp assembly having a bottle mounting projection, and a bottle having an axially oriented projection receiving channel indented into one of its side walls and opening at the bottom of the bottle to receive the projection. The receiving channel removably axially slides over the mounting projection until the projection abuts a channel end wall. The projection has a connecting edge oriented toward and joined to the clasp assembly and an opposing remote edge wider than the connected edge so that the channel wraps around the projection to prevent the bottle from falling off the projection. The clasp assembly includes a strap having two ends and being longitudinally bent end to end to form a loop for encircling a cart frame member. A resilient but firm gripping material is inventively provided along the clasp strap inner wall which deforms to assume the size and shape of the particular frame member it engages. If the clamp assembly is removed and placed upon a different frame member, the gripping material deforms to assume the outer cross-sectional shape of the new frame member. The two strap ends are angled radially outward from the center of the strap loop to form securing end flanges. These flanges abut each other face to face and have mutually aligned bolt ports. The bolt ports receive a securing bolt having a securing nut for holding the flanges together and holding the strap removably closed around the frame member. The securing nut is preferably either a wing nut or has a knurled outer surface for convenient finger gripping and hand operation without the need of tools. The bottle has a beverage receiving and dispensing opening and a lid for covering the opening. A neck portion surrounds the opening and is encircled by a collar connected to the lid by a retaining cord to prevent dropping and contamination of the lid. A flanged axial opening may be provided in the lid for receiving a drinking straw.

2. Description of the Prior Art

There have long been beverage vessel retaining devices for attaching to various structures such as golf carts. These devices have generally been suited for attachment to only one size or shape of frame member or part, thereby limiting their usefulness. They have also often been needlessly complicated and cumbersome, and have often been relatively expensive to manufacture. At the same time, many have been awkward and inconvenient to use.

One such prior device is that of Patton, U.S. Pat. No. 5,105,958, issued on Apr. 21, 1992. Patton discloses a golfer's water bottle and golf bag attachment assembly including a bracket for securing to the bag with a belt which wraps around the circumference of the bag and a hanger element for hooking over the rim of the bag. The bracket has a channel for axially receiving a longitudinal projection extending from the side of the bottle. The projection expands outwardly and the channel correspondingly expands inwardly so that the projection cannot fall laterally out of the channel. A problem with Patton is that the mounting bracket is large and cumbersome, and the strap and hanger elements are not suited for attachment to a wide variety of cart portions, locations and types.

Duncan, U.S. Pat. No. 4,032,054, issued on Jun. 28, 1977, teaches a golf article carrier device. The Duncan device is suspended from a hanger hooked over a strap wrapped around the golf bag. The device includes a compartmentalized container for retaining golf tees, a ball, cigarettes and a drinking vessel. A problem with Duncan is that the cumbersome device protrudes a substantial distance from the side of the bag and could be bumped and its contents spilled. Another problem with Duncan is that the strap and hanger mounting structure is not suited for attachment to a wide variety of cart locations. Still another problem is that the device is complex and relatively expensive to manufacture.

Bolton, U.S. Pat. No. 4,889,267, issued on December 26, 1989, reveals a cooler caddy device for a golf cart. A bottom member cooler support plate is attached to an outwardly extending cart frame protrusion on which a portion of the golf bag typically rests. A bracket wraps around the protrusion and is bolted to the bottom of the cooler support plate. A rounded bracket and a square bracket are provided alternatively for circular and square protrusion cross-sections. A problem with Bolton is that the cooler support plate and cooler protrude a substantial distance from the base of the cart so that the user is likely to trip over them. Another problem is that a different bracket must be provided for every different size and shape of golf cart protrusion, or the device is not transferrable. Another problem is that the apparatus is mounted low on the cart, so that a user has to stoop and bend every time a drink is desired.

Buschbom, U.S. Pat. No. 4,989,767, issued on Feb. 5, 1991, discloses a golf cart cooler device. The Buschbom device is essentially a box which bolts and hooks onto a motorized golf cart floor board. A problem with Buschbom is that no provision apparently is made for attachment to a frame of a golf bag push cart.

Mancl, U.S. Pat. No. 3,313,508, issued on Apr. 11, 1967, reveals a beverage container support device for attachment to a golf cart. A beverage bottle is removably secured to a bracket assembly by spring clips resiliently engaging the side of the bottle or by straps wrapping around the bottle. The assembly is removably secured to the handle of the golf cart by a clamp in the form of a tube having an axial slot through which the handle is received. An outwardly directed flange is provided on either side of the slot through which clamp bolts are inserted for closing the tube around the handle. A problem with Mancl is that the clips or straps make the bottle awkward to remove and replace when a drink is desired. Another problem is that the tubular clamp will securely engage only a very limited variety of handle cross-sectional shapes and sizes.

Proffit, U.S. Pat. No. 4,550,930, issued on Nov. 5, 1985, teaches a two-wheeled golf cart having numerous accessories. These accessories include a swingably retractable cooler support, a seat and cushion, a ball carrier, a score pad and golf tee support structure, and a beverage holder. A problem with Proffit is that the beverage holder is designed for connection to the particular Proffit cart and is not readily transferrable to an existing golf cart of a different construction. Other problems with Proffit are that the cart is cumbersome, complex and costly.

Harm, U.S. Pat. No. 4,844,399, issued on Jul. 4, 1989, discloses a golf bag cart beverage holder device. Two ring elements with hanging, crossed straps are provided for receiving and retaining beverage vessels. An interconnection structure is provided for joining the ring elements together in a spaced apart relationship. This structure includes a hose clamp for securing around a cart member and a hose clamp engaging plate. A problem with Harm is that the device is cumbersome and relatively expensive to manufacture. Another problem is that the hose clamp is not well suited for anchoring the device to a cart member which has other than a round cross-section. Dingle et al., U.S. Pat. No. 3,131,842, issued on May 5, 1964, is structurally similar to Harm and presents the problems of Harm.

It is thus an object of the present invention to provide a beverage bottle and mounting apparatus for connection to a structure such as a golf cart so that the beverage is conveniently accessible to persons near the structure.

It is another object of the present invention to provide such an apparatus which is readily removable from the structure and is self-adapting for attachment to a different portion of the structure within a certain size range or to a portion of a different structure.

It is still another object of the present invention to provide such an apparatus from which the bottle is readily removable and replaceable.

It is finally an object of the present invention to provide such an apparatus which is simple in design, durable and relatively inexpensive to manufacture.

SUMMARY OF THE INVENTION

The present invention accomplishes the above-stated objectives, as well as others, as may be determined by a fair reading and interpretation of the entire specification.

A beverage retaining apparatus is provided for attachment to a part of a structure, the part having a part outer surface and a certain outer surface shape and size, including a beverage retaining vessel having a vessel wall, a bracket for fitting around the part, the bracket including a part encompassing member having an inner member surface and sized so that the inner member surface is larger than and spaced apart from the part outer surface, and including deformable gripping material for filling the space between the inner member surface and the part outer surface and for deforming to fit the certain shape and size of the part outer surface, and an interconnection structure for connecting the vessel to the bracket. The encompassing member preferably includes a strap member having two strap ends and being longitudinally bent end to end to form a loop configuration for encompassing the part outer surface. The interconnection structure preferably removably connects the vessel to the bracket. The vessel preferably includes a vessel opening removably covered by a vessel lid, and a cord for joining the vessel wall to the vessel lid. The interconnection structure preferably includes a channel recessed into the vessel wall having a channel open end, and a projection extending from the encompassing member and sized for sliding axial insertion into the channel through the channel open end, where the channel laterally surrounds the projection to a sufficient extent for the channel to retain the projection against lateral removal of the projection from the channel.

A beverage retaining apparatus is also provided for attachment to a part of a structure, the part having a part outer surface and a certain outer surface shape and size, including a beverage retaining vessel having a vessel wall, a bracket for engaging the part, an interconnection structure for connecting the vessel to the bracket, including a channel recessed into the vessel wall having a channel open end, a projection extending from the bracket and sized for sliding axial insertion into the channel through the channel open end, where the channel laterally surrounds the projection to a sufficient extent for the channel to retain the projection against lateral removal of the projection from the channel. The vessel once again preferably includes a vessel opening removably covered by a vessel lid, and a cord for joining the vessel wall to the vessel lid.

BRIEF DESCRIPTION OF THE DRAWINGS

Various other objects, advantages, and features of the invention will become apparent to those skilled in the art from the following discussion taken in conjunction with the following drawings, in which:

FIG. 1 is a side view of the inventive beverage bottle mounting apparatus secured to a typical golf bag cart upper frame member.

FIG. 2 is a view of the apparatus alone with the bottle oriented to reveal the receiving channel and with the clasp assembly positioned to align the projection for axial insertion into the receiving channel.

FIG. 3 is a cross-sectional view of the bottle, revealing the preferred shape of the receiving channel.

FIG. 4 is a side view of the clasp assembly and attached projection.

FIG. 5 is a side view of the apparatus bottle with a portion of the side wall broken away to reveal the receiving channel.

FIG. 6 is a cross-sectional view of the clasp assembly closed around a circular cart frame member.

FIG. 7 is a cross-sectional view of the clasp assembly closed around a square cart frame member.

FIG. 8 is a cross-sectional view of the clasp assembly in the open position with the securing bolt and nut removed.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–8, an apparatus 10 is disclosed for mounting on a frame member 12, having any of a variety of member cross-sectional sizes and shapes, of a golf bag cart 14 frame or other suitable structure. Apparatus 10 preferably includes a self-adapting frame member engaging clasp assembly 20 having a bottle mounting projection 22, and a beverage retaining bottle 30 having an axially oriented projection receiving channel 32 indented into its side wall 34 which opens through the bottom 36 of bottle 30 to receive projection 22.

Channel 32 removably and axially slides over mounting projection 22 until projection 22 abuts channel end wall 24. See FIGS. 2–5. Projection 22 preferably has a V-shaped cross-section, where the base of the V-shape, referred to hereafter as the projection connecting edge 42, connects to an interconnecting link member 44 which in turn connects to the engaging clasp assembly 20. See FIG. 6. The wide upper part of the V-shape, hereafter referred to as the projection remote edge 46, is wider than the connecting edge 42 so that channel 32 wraps around projection 22. As a result, channel 32 cannot laterally disengage from projection 22 and bottle 30 cannot fall off assembly 20. The lateral opening of channel 32 for receiving link member 44 is a slot 52 only slightly larger than the width of link member 44. A leading upper end 54 of projection 22 is preferably pointed as shown in FIG. 2 to more readily fit into channel 32.

Clasp assembly 20 preferably includes a strap 56 having two strap ends 62 and being longitudinally bent end 62 to end 62 to form a loop configuration for encircling a frame member 12. A resilient but firm gripping material 60 is inventively provided along the looped strap inner wall 64. See FIGS. 6–8. Gripping material 60 functions to deform to assume the size and shape of the particular frame member 12 cross-section and to create a friction engagement of frame member 12. If frame engaging clasp assembly 20 is removed and placed upon a different location on frame member 12 or on a different frame member 12, gripping material 60 deforms to assume the cross-sectional shape and size of the new frame member 12. See FIGS. 6 and 7. The thickness of gripping material 60 is at least 0.146, which is the minimum cross-sectional engaging member distance. The 0.146 figure represents the minimum thickness necessary as a matter of geometry to switch between like-sized circular and square cross-sectional part shapes. The geometric calculations leading to the 0.146 figure are as follows:

Pythagorean theorem: $a^2+b^2=c^2$

In this instance, "c" is the hypotenuse of a triangle formed by dividing a square across opposing corners. Yet "c" is also the diameter "d" of a superimposed circle interesecting the triangle at the three triangle corner points. Thus c=d. Since the square has equal sides, a=b. The equation becomes:

$a^2+a^2=d^2$ $2a^2=d^2$

Taking the square root of both sides, this becomes:

$1.414a=d$ $a=0.7071d$

The minimum padding thickness needed to fill the space between the middle of a side of the square and the locus of the circle is "x":

$2x=d-0.7071d=0.293d$ $x=0.14645d$

The two strap ends 62 are angled radially outward from the center of the strap 56 loop to form securing end flanges 66. Flanges 66 abut each other face to face and have mutually aligned bolt ports 72. Bolt ports 72 simultaneously receive a securing bolt 74 fitted with a removable securing nut 76 to hold flanges 66 together and strap 56 removably closed around the frame member 12. See FIG. 8. Securing nut 76 is preferably either a wing nut or has a knurled outer surface 82 for convenient finger gripping and hand operation without the need of tools.

Bottle 30 preferably has an opening 90 with a bottle closing lid 92 for covering opening 90. A bottle neck portion 94 preferably surrounds opening 90. A collar member 96 preferably encircles neck portion 94 and is joined to closing lid 92 by a lid retaining cord 98 to prevent dropping and soiling of lid 92. A drinking straw receiving opening 90 optionally may be provided in lid 92 and may be surrounded by an outwardly directed axial flange 102.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A beverage retaining apparatus for attachment to any one of several parts of several known structures, the given part having a part outer surface and having any of several cross-sectional shapes including circular and square, comprising:

a beverage retaining vessel having a vessel wall, bracket means for fitting around said part, said bracket means comprising a part encompassing member having an open mode for receiving a part and a closed mode for engaging and gripping said part, wherein said engaging member in said closed mode defines a substantially fixed member cross-sectional area within said encompassing member, said member cross-sectional area having a minimum cross-sectional distance, said encompassing member having an inner member surface and sized such that said inner member surface is larger than and spaced apart from said given part outer surface, and comprising deformable gripping material extending from said inner member surface for filling the space between said inner member surface and said given part outer surface, said deformable gripping material having a cross-sectional thickness of at least 0.146 of said encompassing member minimum cross-sectional distance to circumferentially engage and circumferentially and substantially continuously abut both circular and square shaped part cross-sections, interconnection means for connecting said vessel to said bracket means.

2. The apparatus of claim 1, wherein said encompassing member comprises a strap member having two strap ends and being longitudinally bent end to end to form a loop configuration for encompassing said part outer surface.

3. The apparatus of claim 1, wherein said interconnection means removably connects said vessel to said bracket means.

4. The apparatus of claim 1, wherein said vessel comprises a vessel opening removably covered by a vessel lid, and cord means for joining said vessel wall to said vessel lid.

5. The apparatus of claim 2, wherein said interconnection means comprises:

a channel recessed into said vessel wall having a channel open end, a projection extending from said encompassing member and sized for sliding axial insertion into said channel through said channel open end, wherein said channel laterally surrounds said projection to a sufficient extent for said channel to retain said projection against lateral removal of said projection from said channel.

6. A beverage retaining apparatus for attachment to any one of several parts of several known structures, the given part having a part outer surface and having any of several cross-sectional shapes including circular and square, comprising:

a beverage retaining vessel having a vessel wall, bracket means for fitting around said part, said bracket means comprising a part encompassing member having an open mode for receiving a part and a closed mode for engaging and gripping said part, wherein said engaging member in said closed mode defines a substantially fixed member cross-sectional area within said encompassing member, said encompassing member having an inner member surface and sized such that said inner member surface is larger than and spaced apart from said given part outer surface, and comprising deformable gripping material extending from said inner member surface for filling the space between said inner member surface and said given part outer surface, said deformable gripping material having a cross-sectional thickness, softness, pliancy and resilience to circumferentially engage and circumferentially and substantially continuously abut said given part outer surface where said part has any one of a circular and a square cross-sectional shape, interconnection means for connecting said vessel to said bracket means.

7. The apparatus of claim 6, wherein said vessel comprises a vessel opening removably covered by a vessel lid, and cord means for joining said vessel wall to said vessel lid.

* * * * *